United States Patent
Wang et al.

(10) Patent No.: US 8,736,129 B2
(45) Date of Patent: May 27, 2014

(54) END CAPS FOR STATOR SEGMENTS OF SEGMENTED STATOR ASSEMBLIES

(75) Inventors: William Wang, Chesterfield, MO (US);
Paul G. Michaels, St. Louis, MO (US);
Brian P. Fogarty, O'Fallon, MO (US);
J. Scott Rose, Alton, IL (US); Donald R. Shaw, Fenton, MO (US); Jason J. Jurkowski, O'Fallon, MO (US)

(73) Assignee: Emerson Electric Co., St. Louis, MO (US)

( * ) Notice: Subject to any disclaimer, the term of this patent is extended or adjusted under 35 U.S.C. 154(b) by 329 days.

(21) Appl. No.: 12/909,592

(22) Filed: Oct. 21, 2010

(65) Prior Publication Data
US 2012/0098380 A1    Apr. 26, 2012

(51) Int. Cl.
*H02K 3/46* (2006.01)
*H02K 3/52* (2006.01)
*H01R 4/24* (2006.01)

(52) U.S. Cl.
USPC .............................. 310/194; 310/71; 439/400

(58) Field of Classification Search
USPC ................ 310/194; 439/399–400, 595, 733.1
See application file for complete search history.

(56) References Cited

U.S. PATENT DOCUMENTS

| | | | |
|---|---|---|---|
| 2,894,157 A * | 7/1959 | Morrill | 310/179 |
| 3,979,615 A * | 9/1976 | Neff | 310/71 |
| 4,287,446 A * | 9/1981 | Lill et al. | 310/71 |
| 4,926,079 A * | 5/1990 | Niemela et al. | 310/71 |
| 5,786,651 A | 7/1998 | Suzuki | |
| 5,984,735 A * | 11/1999 | Daoud | 439/733.1 |
| D445,762 S | 7/2001 | Shida et al. | |
| 6,509,665 B1 | 1/2003 | Nishiyama et al. | |
| 6,979,222 B2 * | 12/2005 | Comini | 439/404 |
| 6,984,911 B2 * | 1/2006 | Horie et al. | 310/194 |
| 7,026,739 B2 * | 4/2006 | Okada et al. | 310/194 |
| D525,196 S | 7/2006 | Rose et al. | |
| 7,116,023 B2 | 10/2006 | Wang et al. | |
| D539,219 S | 3/2007 | Wang et al. | |
| D539,737 S | 4/2007 | Wang et al. | |
| 7,374,449 B2 * | 5/2008 | Demuth et al. | 439/404 |
| 7,382,075 B2 | 6/2008 | Wang et al. | |
| 7,414,347 B2 | 8/2008 | Wang et al. | |
| 7,569,958 B2 * | 8/2009 | Matsuzaki et al. | 310/71 |
| 7,578,047 B2 | 8/2009 | Wang et al. | |
| 7,583,002 B2 * | 9/2009 | Lyle et al. | 310/216.009 |
| 7,586,231 B2 | 9/2009 | Wang et al. | |
| D660,234 S | 5/2012 | Wang et al. | |

(Continued)

FOREIGN PATENT DOCUMENTS

WO    2007/143805    * 12/2007    ............... H01R 4/22

*Primary Examiner* — Burton Mullins
(74) *Attorney, Agent, or Firm* — Harness, Dickey & Pierce, P.L.C.

(57) ABSTRACT

An example end cap of a stator segment is provided for use in locating wires in a segmented stator assembly in desired positions. The end cap generally includes a body and an inboard wall. An identifier is defined by the inboard wall of the end cap for use in determining wire sizes to be used with the end cap. Terminal pockets are provided in the body for receiving the wires and making desired electrical connections, and steps located in the terminal pockets help secure the connectors in the terminal pockets. Plateaus, and troughs defined in the plateaus, are located outside the terminal pockets for use in trimming wires received in the terminal pockets as desired. And, retaining structures are located around the end cap to help with locating the wires in the desired positions.

19 Claims, 12 Drawing Sheets

(56) References Cited

U.S. PATENT DOCUMENTS 8,585,446 B2 * 11/2013 Manske et al. ............... 439/752
2005/0012413 A1 * 1/2005 Bott et al. ................. 310/71
2007/0114877 A1 * 5/2007 Wang et al. ................ 310/259
2010/0181863 A1 * 7/2010 Murakami et al. ........... 310/215

* cited by examiner

END CAPS FOR STATOR SEGMENTS OF SEGMENTED STATOR ASSEMBLIES

FIELD

The present disclosure generally relates to end caps for use in stator segments of segmented stator assemblies.

BACKGROUND

This section provides background information related to the present disclosure which is not necessarily prior art.

Segmented stator assemblies are often used in electric machines such as, for example, hermetic compressor motors. The segmented stator assemblies typically include a plurality of annularly disposed stator segments coupled together, and rotors positioned within bores formed by the coupled stator segments. The stator segments are each wound with magnet wire, which can be energized to cause mechanical movement of the rotors for operation. The stator segments can each be wound with magnet wire individually, or several stator segments can be wound with a common, continuous magnet wire (e.g., chain wound, etc.). End caps are often coupled to end portions of the stator segments to insulate the stator segments from the magnet wire and to facilitate placement of the magnet wire on the stator segments. The end caps can also include features for routing the magnet wire as necessary.

SUMMARY

This section provides a general summary of the disclosure, and is not a comprehensive disclosure of its full scope or all of its features.

Example embodiments of the present disclosure relate to end caps for stator segments of segmented stator assemblies. The segmented stator assemblies are suitable for use in electric machines.

In one example embodiment, an end cap generally includes a body configured to couple the end cap to a stator segment at a first end portion of the body adjacent a yoke of the stator segment. The body includes a retainer disposed toward a second end portion of the body. The retainer is configured to receive a wire interconnecting the stator segment and at least one other stator segment of the segmented stator assembly and inhibit movement of the wire in at least one direction along a line extending generally between the first and second end portions of the body.

In one example embodiment, an end cap for a stator segment of a segmented stator assembly generally includes a terminal pocket configured to receive a wire and an insulation displacement connector for use in holding the wire in the terminal pocket, a retainer configured to support the wire received by the terminal pocket on the end cap in a desired position, and an angled guide disposed adjacent the terminal pocket and configured to allow locating the wire in the desired position on the end cap along the angled guide between the terminal pocket and the retainer.

In one example embodiment, an end cap for a stator segment of a segmented stator assembly generally includes at least two terminal pockets each configured to receive at least one wire and an insulation displacement connector for use in holding the at least one wire in said terminal pocket, and at least two retainers each configured to support at least one wire received by at least one of the at least two terminal pockets on the end cap in a desired position. At least one of the at least two retainers includes an arm configured to inhibit movement of the at least one wire supported by the at least one of the at least two retainers into a position generally over the end cap.

In one example embodiment, an end cap for a stator segment of a segmented stator assembly generally includes an inboard wall configured to couple the end cap to a stator segment at a first end portion of the inboard wall adjacent a tooth of the stator segment. The inboard wall has an identifier for use in determining a wire winding gauge to be used with the stator segment.

In one example embodiment, an end cap for a stator segment of a segmented stator assembly generally includes a terminal pocket configured to receive a wire and an insulation displacement connector for use in holding the wire in the terminal pocket. The terminal pocket includes at least one step for use in securing the insulation displacement connector in the terminal pocket.

In one example embodiment, an end cap for a stator segment of a segmented stator assembly generally includes a body configured to couple the end cap to a stator segment over a yoke of the stator segment. The body includes a terminal pocket configured to receive a wire and an insulation displacement connector for use in holding the wire in the terminal pocket, and a shelf disposed generally between the terminal pocket and an outward portion of the body.

In one example embodiment, an end cap for a stator segment of a segmented stator assembly generally includes a terminal pocket configured to receive a wire and an insulation displacement connector for use in holding the wire in the terminal pocket, a shelf disposed generally between the terminal pocket and an outward portion of the body, and a trough formed in the shelf adjacent the terminal pocket for use in cutting the wire received in the terminal pocket.

In one example embodiment, an end cap for a stator segment of a segmented stator assembly generally includes a terminal pocket configured to receive a wire and an insulation displacement connector for use in holding the wire in the terminal pocket. The terminal pocket includes a buttress disposed along at least part of a sidewall portion of the terminal pocket for reinforcing the terminal pocket.

In one example embodiment, an end cap for a stator segment of a segmented stator assembly generally includes a body configured to couple the end cap to a stator segment over a yoke of the stator segment, and an inboard wall coupled to the body. The inboard wall is configured to couple the end cap to the stator segment over a tooth of the stator segment, and a height of the body is greater than a height of the inboard wall.

In one example embodiment, an end cap for a stator segment of a segmented stator assembly generally includes a body configured to couple the end cap to a stator segment over a yoke of the stator segment. The body includes at least one rib extending at least partly between upper and lower end portions of the body. The at least one rib has a thickness dimension of between about 0.005 inch and about 0.015 inch.

In one example embodiment, an end cap for a stator segment of a segmented stator assembly generally includes an inboard wall configured to couple the end cap to a stator segment over a tooth of the stator segment. The inboard wall includes at least one rib extending at least partly between upper and lower end portions of the inboard wall. The at least one rib has a thickness dimension of between about 0.005 inch and about 0.015 inch.

In one example embodiment, an end cap for a stator segment of a segmented stator assembly generally includes a coupling configured to couple to an end cap of an adjacent stator segment of the segmented stator assembly. The coupling has first and second opposing sidewalls and a cover coupled to corresponding end portions of the first and second opposing sidewalls. The first and second opposing sidewalls and the cover define a channel of the coupling configured to receive a mating coupling from the end cap of the adjacent stator segment for coupling the end caps of the adjacent stator segments together.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments of the present disclosure generally relate to segmented stator assemblies having a plurality of discrete stator segments arranged in annular patterns (with adjacent ones of the stator segments positioned in physical contact with each other to form closed magnetic circuits). Rotors and shafts can be positioned for rotation within bores defined by the annular patterns of the stator segments, and the segmented stator assemblies can be positioned within motor shells for operation, for example, in electric motors (e.g., variable speed motor applications, hermetic compressor motors, etc.), etc. Example embodiments of the present disclosure also relate to stator segments suitable for use in the segmented stator assemblies, as well as to end caps suitable for use with the stator segments.

Figure 1:
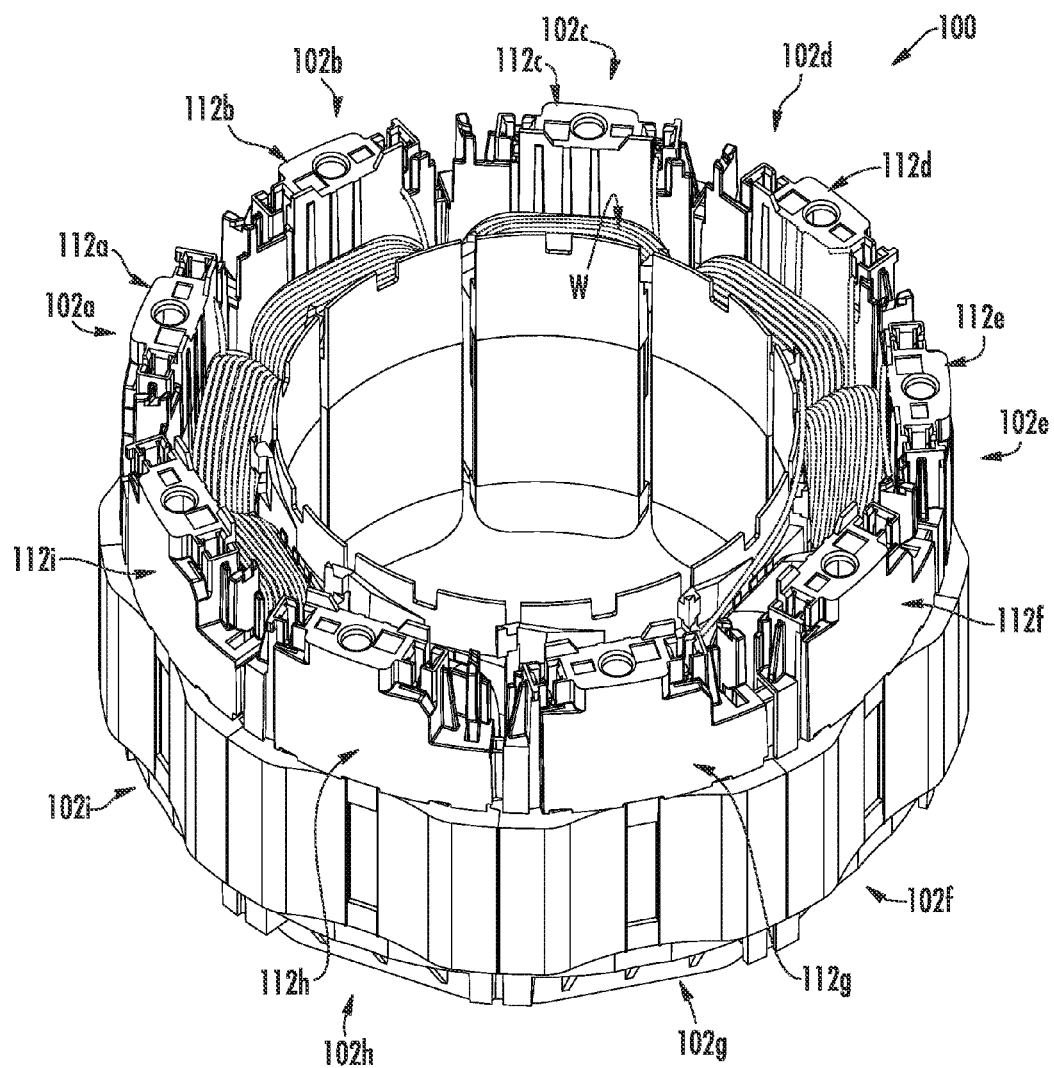
FIG. 1 is a perspective view of an example embodiment of a segmented stator assembly with interconnect wires of the segmented stator assembly removed for clarity.

With reference now to the drawings, FIG. 1 illustrates an example embodiment of a segmented stator assembly 100 including at least one or more aspects of the present disclosure. The segmented stator assembly 100 includes multiple stator segments 102a-i each individually wound with wire W using suitable operations (e.g., fly winding, needle winding, operations using spindles and bobbins, etc.) (also see, U.S. Pat. No. 7,578,047 (Wang et al.) the entire disclosure of which is incorporated herein by reference). The wire windings W allow the segmented stator assembly 100 to achieve an electromagnet having a desired polarity when the wire windings W are energized. Interconnect wires A, B, C, and N (not shown in FIG. 1, but see FIGS. 2-5) can then be extended between select ones of the stator segments 102a-i to connect the individual stator segments 102a-i (and their wire windings W) to allow for desired operation of the segmented stator assembly 100. The segmented stator assembly 100 illustrated in FIG. 1 includes nine stator segments 102a-i. In other example embodiments, segmented stator assemblies can include a number of stator segments other than nine within the scope of the present disclosure.

FIGS. 2-5 illustrate the example wiring scheme of the segmented stator assembly 100 of FIG. 1 (having the nine stator segments 102a-i). Three differently phased interconnect wires (Phase-A, -B, and -C interconnect wires) are connected to end portions of the wire windings W of three different groups of the stator segments 102a-i to provide three phase operation (however other numbers of phases may be provided within the scope of the present disclosure). And, a neutral N (or common) interconnect wire connects to all of the stator segments 102a-i. Suitable operations (e.g., automated stitching operations, etc.) can be used to install the interconnect wires A, B, C, and N in the particular sequence to form the desired three-phase arrangement, and in desired positions to avoid phase-on-phase issues. This example wiring scheme will be described in more detail hereinafter.

FIGS. 6-9 illustrate a first stator segment 102a of the segmented stator assembly 100 of FIG. 1. In the illustrated embodiment, all nine of the stator segments 102a-i of the segmented stator assembly 100 are substantially the same. As such, the first stator segment 102a will be described next with it understood that descriptions of the other eight stator segments 102b-i illustrated in FIG. 1 are substantially the same. In other example embodiments, segmented stator assemblies may have multiple stator segments where at least two or more of the stator segments are substantially different.

The illustrated stator segment 102a is formed by stacking laminated sheets of, for example, stamped steel, etc. together to define a yoke 104 and a tooth 106 of the stator segment 102a. A ridge 108 is formed in a first side portion (to the left in FIG. 6) of the yoke 104 and a slot 110 is formed in a second side portion (to the right in FIG. 6) of the yoke 104. The slot 110 is configured to receive a ridge of an adjacent stator segment (e.g., a ridge of the ninth stator segment 102i illustrated in FIG. 1, etc.) and the ridge 108 is configured to fit in a slot of another adjacent stator segment (e.g., a slot of the second stator segment 102b illustrated in FIG. 1, etc.) to help align the adjacent stator segments (e.g., adjacent stator segments 102i, 102a, and 102b, etc.) when brought together to form the segmented stator assembly 100 (FIG. 1). Strips of insulating material (e.g., MYLAR®, etc.) (not shown) can be positioned vertically along the stator segment 102a generally between the yoke 104 and the tooth 106 to provide protection to the wire windings W as they are applied to the stator segment 102a as well as to insulate the wire windings W between the adjacent stator segments (e.g., adjacent stator segments 102i, 102a, and 102b, etc.).

The illustrated stator segment 102a includes a lead end cap 112a and a base end cap 113a. The lead end cap 112a couples to the yoke 104 and tooth 106 of the stator segment 102a toward an upper end portion (e.g., toward a lead end portion, etc.) of the stator segment 102a (as viewed in FIGS. 6-9). The lead end cap 112a is located on the stator segment 102a such that a body 116 of the lead end cap 112a positions on the yoke 104 of the stator segment 102a, and a bridge 118 (not visible in FIGS. 6-9, but see FIG. 10) and an inboard wall 120 of the lead end cap 112a position on the tooth 106. An outward mounting leg 122 located along a lower end portion of the body 116 is received in a channel 124 formed in the yoke 104 of the stator segment 102a. And, inward mounting legs 126 located along a lower end portion of the inboard wall 120 are received (e.g., via an interference fit, etc.) along an inner surface portion of the tooth 106. Together, the outward mounting leg 122 and the inward mounting legs 126 operate to securely hold, via a press-fit relationship, the lead end cap 112a in position on the upper end portion of the stator segment 102a.

The base end cap 113a of the stator segment 102a couples to the yoke 104 and tooth 106 toward a lower end portion (e.g., toward a base end portion, etc.) of the stator segment 102a (as viewed in FIGS. 6-9). The base end cap 113a is located on the stator segment 102a such that a body 117 of the base end cap 113a positions on the yoke 104 of the stator segment 102a, and a bridge (not visible) and an inboard wall 121 of the base end cap 113a position on the tooth 106. An outward mounting leg 123 located along a lower end portion of the body 117 is received in the channel 124 formed in the yoke 104. And, inward mounting legs 127 located along a lower end portion of the inboard wall 121 are received (e.g., via an interference fit, etc.) along the inner surface portion of the tooth 106. Together, the outward mounting leg 123 and the inward mounting legs 127 operate to securely hold, via a press-fit relationship, the base end cap 113a in position on the lower end portion of the stator segment 102a.

In the illustrated embodiment, the body 116, the bridge 118, and the inboard wall 120 of the lead end cap 112a are monolithically formed (e.g., molded, etc.) from the same material (e.g., plastic, etc.). Similarly, the body 117, the bridge, and the inboard wall 121 of the base end cap 113a are monolithically formed (e.g., molded, etc.) from the same material (e.g., plastic, etc.). In other example embodiments, end caps can include bodies, bridges, and inboard walls separately formed and subsequently coupled together (e.g., welded, etc.) within the scope of the present disclosure.

With continued reference to FIGS. 6-9, the lead end cap 112a of the illustrated stator segment 102a includes a male coupling 128 and a female coupling 130, and the base end cap 113a includes a male coupling 129 and a female coupling 131. The male and female couplings 128, 129 and 130, 131 of the lead and base end caps 112a, 113a couple the lead end cap 112a and the base end cap 113a of the stator segment 102a to corresponding end caps of adjacent stator segments (e.g., the ninth and second stator segments 102i, 102b as shown in FIG. 1, etc.). As such, the male and female couplings 128, 129 and 130, 131 of the lead and base end caps 112a, 113a help hold the stator segment 102a together with the adjacent stator segments in the segmented stator assembly 100 (e.g., during manufacturing processes, operation, etc.). In some example embodiments, plastic, metal, etc. cable ties or removable clamps can be positioned about stator segments of segmented stator assemblies for temporarily helping hold the stator segments together.

The female coupling 130 of the lead end cap 112a is located along a first lateral edge portion (to the left in FIG. 6) of the lead end cap's body 116, and the male coupling 128 is located along a second lateral edge portion (to the right in FIG. 6) of the body 116. The female coupling 130 is configured to mate with a male coupling of a lead end cap of an adjacent stator segment (e.g., the lead end cap 112b of the second stator segment 102b in FIG. 1, etc.), and the male coupling 128 is configured to mate with a female coupling of a lead end cap of another adjacent stator segment (e.g., the lead end cap 112i of the ninth stator segment 102i in FIG. 1, etc.).

The male coupling 128 includes two deformable catches (each indicated by reference number 132), and the female coupling 130 includes a grooved channel 134 defined by opposing sidewalls (each indicated by reference number 136). The grooved channel 134 is configured to receive male coupling catches of an adjacent stator segment (e.g., the second stator segment 102b in FIG. 1, etc.). And, when the catches are pressed into the grooved channel 134, they deform and engage inside the grooved channel 134 in a snap-fit relationship. Similarly, the catches 132 of the first stator segment 102a are configured to be pressed into a female coupling of an adjacent stator segment (e.g., the ninth stator segment 102i in FIG. 1, etc.), where they deform and engage inside a grooved channel of the female coupling in a snap-fit relationship. These snap-fit relationships between the male and female couplings 128, 130 of the first stator segment 102a and the male and female couplings of the adjacent stator segments help hold the lead end caps (and thus the adjacent stator segments) together.

The female coupling 130 of the lead end cap 112a also includes a cover 138 coupled to corresponding end portions of the first and second opposing sidewalls 136 of the female coupling 130. The cover 138 is configured to generally close an upper portion of the grooved channel 134 of the female coupling 130 and inhibit catches of a mating male coupling (e.g., of the second stator segment 102b in FIG. 1, etc.) from exiting the grooved channel 134 (and, for example, interfering with other components, operations, etc. of the segmented stator assembly 100, electric motor, etc.) if inadvertently broken during assembly, manufacturing, operation, etc.

The female coupling 131 of the base end cap 113a is located along a first lateral edge portion (to the left in FIG. 6) of the base end cap's body 117, and the male coupling 129 is located along a second lateral edge portion (to the right in FIG. 6) of the body 117. The male and female couplings 129, 131 of the base end cap 113a are configured to couple the base end cap 113a to base end caps of adjacent stator segments (e.g., to the base end caps of the adjacent ninth and second stator segments 102i, 102b in FIG. 1, etc.) in similar snap-fit relationships to that described for the male and female couplings 128, 130 of the lead end cap 112a.

The base end cap 113a also includes an alignment finger 133 located generally above the female coupling 131 and an alignment slot 135 located generally above the male coupling 129. The alignment finger 133 is configured to fit in an alignment slot of a base end cap of an adjacent stator segment (e.g., the second stator segment 102b in FIG. 1, etc.), and the alignment slot 135 is configured to receive an alignment finger of a base end cap of another adjacent stator segment (e.g., the ninth stator segment 102i in FIG. 1, etc.). As such, the alignment slot 135 and the alignment finger 133 of the base end cap 113a can help align the first stator segment 102a with adjacent stator segments during assembly.

In the illustrated embodiment, the male and female couplings 128, 130 of the lead end cap 112a and the male and female couplings 129, 131 base end cap 113a (when coupled to corresponding male and female couplings of end caps of adjacent stator segments) are configured to allow relative axial adjustment of the adjacent stator segments as necessary, for example, to accommodate height differences between the stator segments. In addition in the illustrated embodiment, the male and female couplings 128, 130 of the lead end cap 112a are formed monolithically with the body 116 of the lead end cap 112a (e.g., via a molding process, etc.). And, the male and female couplings 129, 131 of the base end cap 113a are formed monolithically with the body 117 of the base end cap 113a (e.g., via a molding process, etc.). In other example embodiments, however, end caps can include bodies having male and/or female couplings formed separately from the bodies and subsequently coupled thereto (e.g., welded, etc.) within the scope of the present disclosure.

FIGS. 10-18 illustrate the lead end cap 112a of the first stator segment 102a (FIGS. 6-9) of the segmented stator assembly 100 of FIG. 1. In the illustrated embodiment, all of the lead end caps 112a-112i are substantially the same. As such, the first lead end cap 112a will be described next with it understood that descriptions of the other lead end caps 112b-112i of the illustrated segmented stator assembly 100 are substantially the same. In other example embodiments, segmented stator assemblies may include multiple stator segments where at least two or more of the stator segments have different lead end caps.

Figure 8:
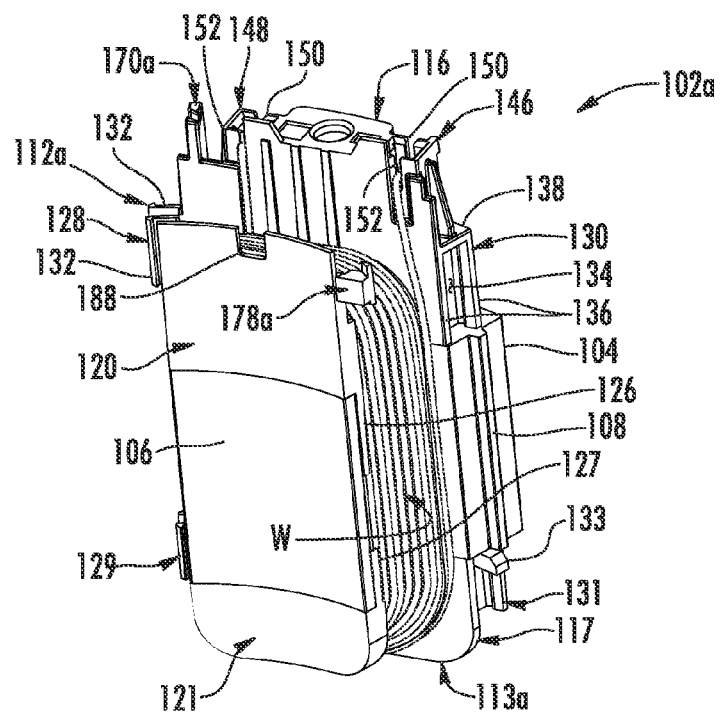
FIG. 8 is a rearward perspective view of the first stator segment of FIG. 6.
Figure 9:
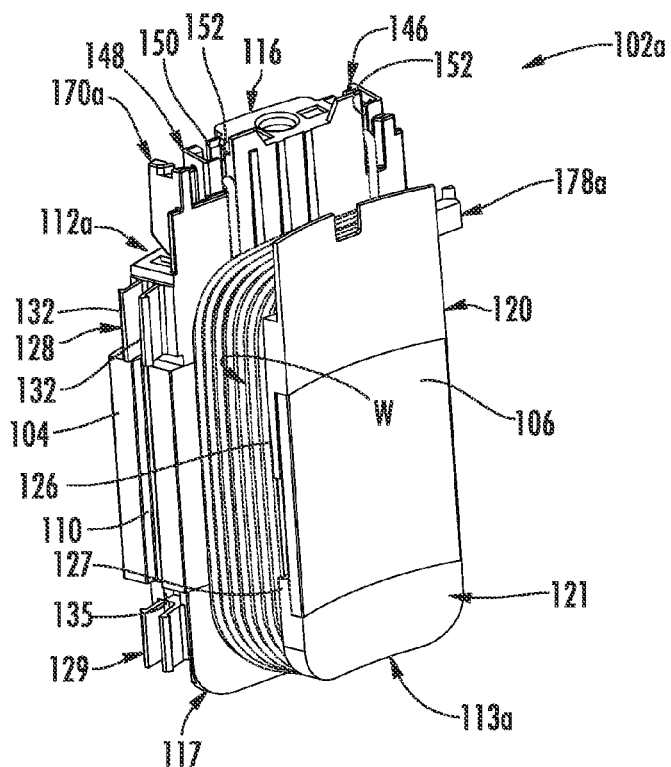
FIG. 9 is another rearward perspective view of the first stator segment of FIG. 6.
Figure 10:
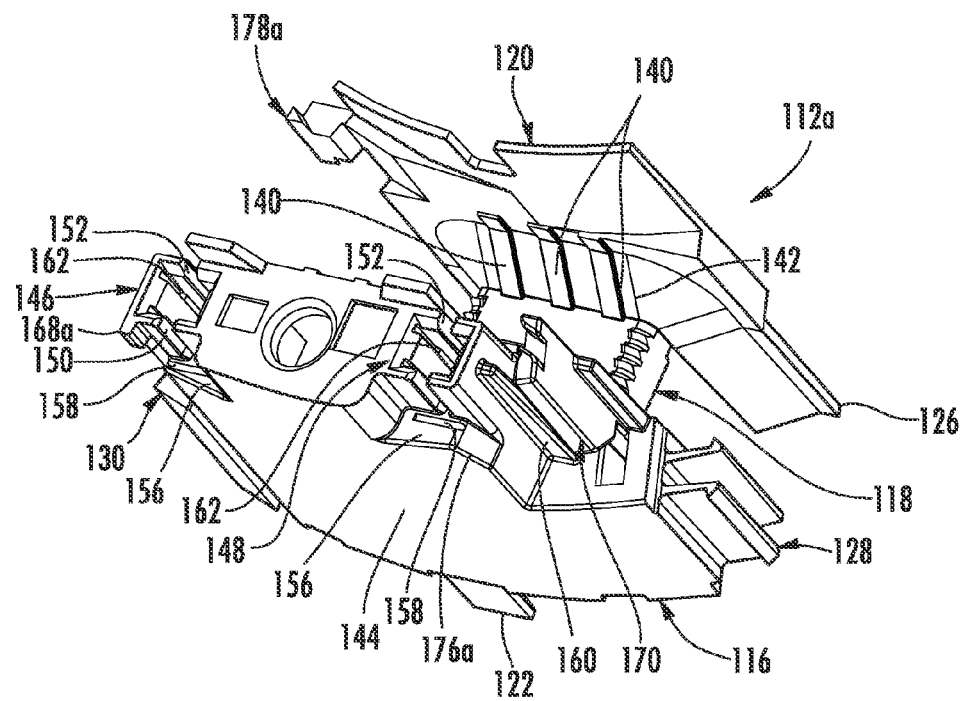
FIG. 10 is an upper perspective view of a lead end cap of the first stator segment of FIG. 6.
Figure 11:
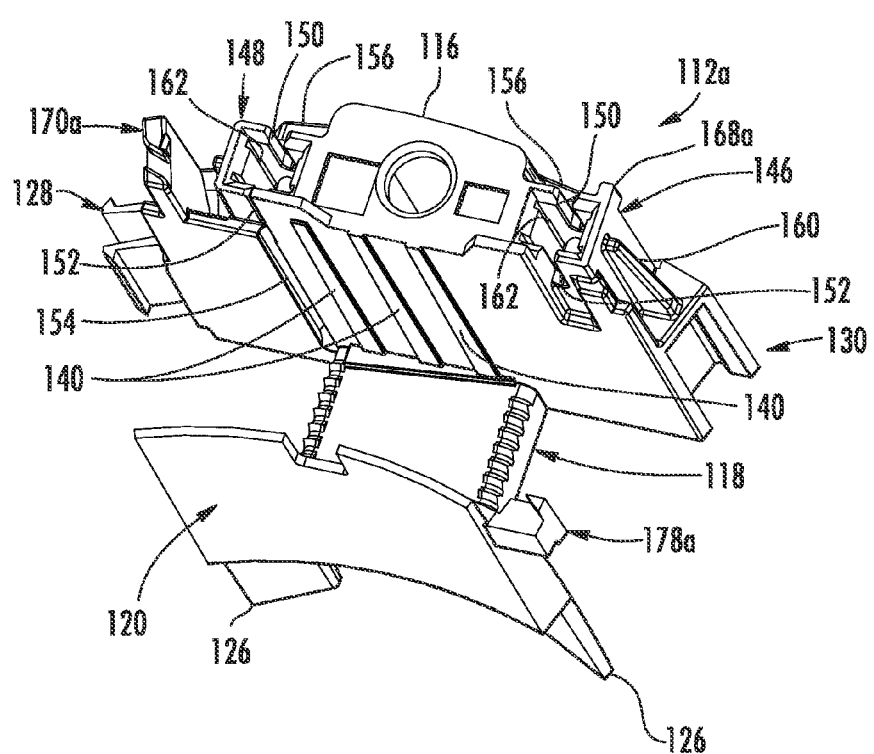
FIG. 11 is a rearward perspective view of the lead end cap of FIG. 10.

As shown in FIGS. 10 and 11, the illustrated lead end cap 112a generally includes the body 116, the bridge 118, and the inboard wall 120. The bridge 118 is disposed generally between the body 116 and the inboard wall 120 and couples to the lower end portion of the body 116 and to the lower end portion of the inboard wall 120. As such, the body 116, the bridge 118, and the inboard wall 120 of the end cap 112a define a region that generally aligns with the stator segment 102a for receiving the wire windings W of the stator segment 102a over the end cap 112a (FIGS. 8 and 9). In particular, the wire windings W are wound about the stator segment 102a so that a portion of the wire windings W are positioned over the bridge 118 between the body 116 and the inboard wall 120.

Ribs (each indicated by reference number 140) are formed on inner surfaces of the body 116 and the inboard wall 120. The ribs 140 can have thickness dimensions that generally match the thickness of any insulating material strips (e.g., MYLAR®, etc.) (not shown) applied to the stator segment 102a generally between the yoke 104 and the tooth 106. As such, the ribs 140 can help ensure that a consistent volume of wire winding W is wrapped around the stator segment 102a. In the illustrated embodiment, for example, three ribs 140 are formed on the inner surface of the body 116 extending in a direction generally between the lower end portion and an upper end portion of the body 116. And, three ribs 140 are formed on the inner surface of the inboard wall 120 extending in a direction generally between the lower end portion and an upper end portion of the inboard wall 120 (and at least partly along a sloped portion 142 of the inboard wall 120). The ribs 140 of both the body 116 and the inboard wall 120 can each have a thickness dimension of between about 0.001 inch and about 0.015 inch. In other example embodiments, however, end caps can have other numbers of ribs and/or ribs with dimensions other than disclosed herein and/or ribs with different dimensions within the scope of the present disclosure.

Figure 12:
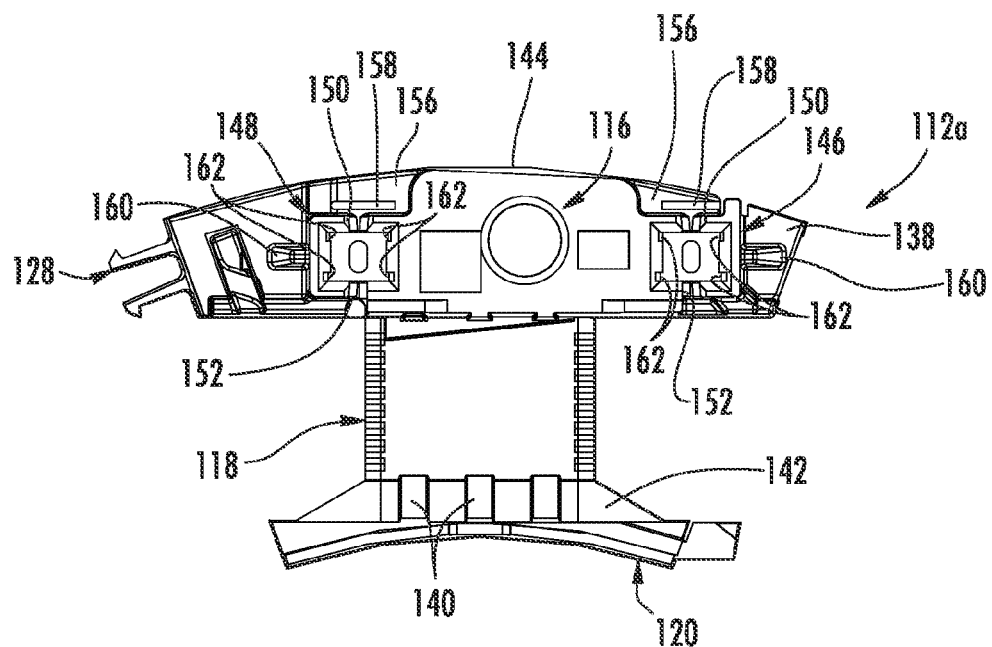
FIG. 12 is a top plan view of the lead end cap of FIG. 10.

With additional reference to FIG. 12, an outward portion (e.g., outward face 144, etc.) of the body 116 of the lead end cap 112a includes a generally rounded profile. As such, the outward portion of the body 116 defines a generally continuous, arcuate shape (e.g., an arcuate shape without interruption across the outward portion of the body 116, etc.). This arcuate shape can help improve fit of the end cap 112a within a motor shell (not shown) (e.g., can help improve contact of the end cap 112a with the motor shell, etc.). The arcuate shape also provides a generally continuous surface across the end cap 112a for labeling (e.g., for receiving barcodes, etc.), marking, etc. the end cap 112a as desired.

First and second terminal pockets 146, 148 are located on the upper end portion of the body 116 and are spaced inwardly of the generally arcuate outward portion of the body 116. This recessed positioning of the first and second terminal pockets 146, 148 can help locate the terminal pockets 146, 148 away from a motor shell in which the segmented stator assembly 100 may be positioned. This recessed positioning can also help extend clearance between any wires (e.g., wire windings W; interconnect wires A, B, C, N; etc.) received by the terminal pockets 146, 148 and the motor shell.

The first and second terminal pockets 146, 148 facilitate making electrical connections with wires (e.g., wire windings W; interconnect wires A, B, C, N; etc.) of the segmented stator assembly 100. Each of the terminal pockets 146, 148 is configured to receive at least one wire (depending on desired operation of the segmented stator assembly 100) along with an insulation displacement connector (IDC) (not shown) for use in holding the at least one wire in each of the terminal pockets 146, 148. When more than one wire is received in the terminal pockets 146, 148, the IDC also functions to electrically connect the wires to allow for desired operation of the segmented stator assembly 100. The IDC can also provide a terminal, as desired, for connecting at least one wire lead between the segmented stator assembly 100 and an electric motor. Any suitable IDC can be used within the scope of the present disclosure.

Figure 4:
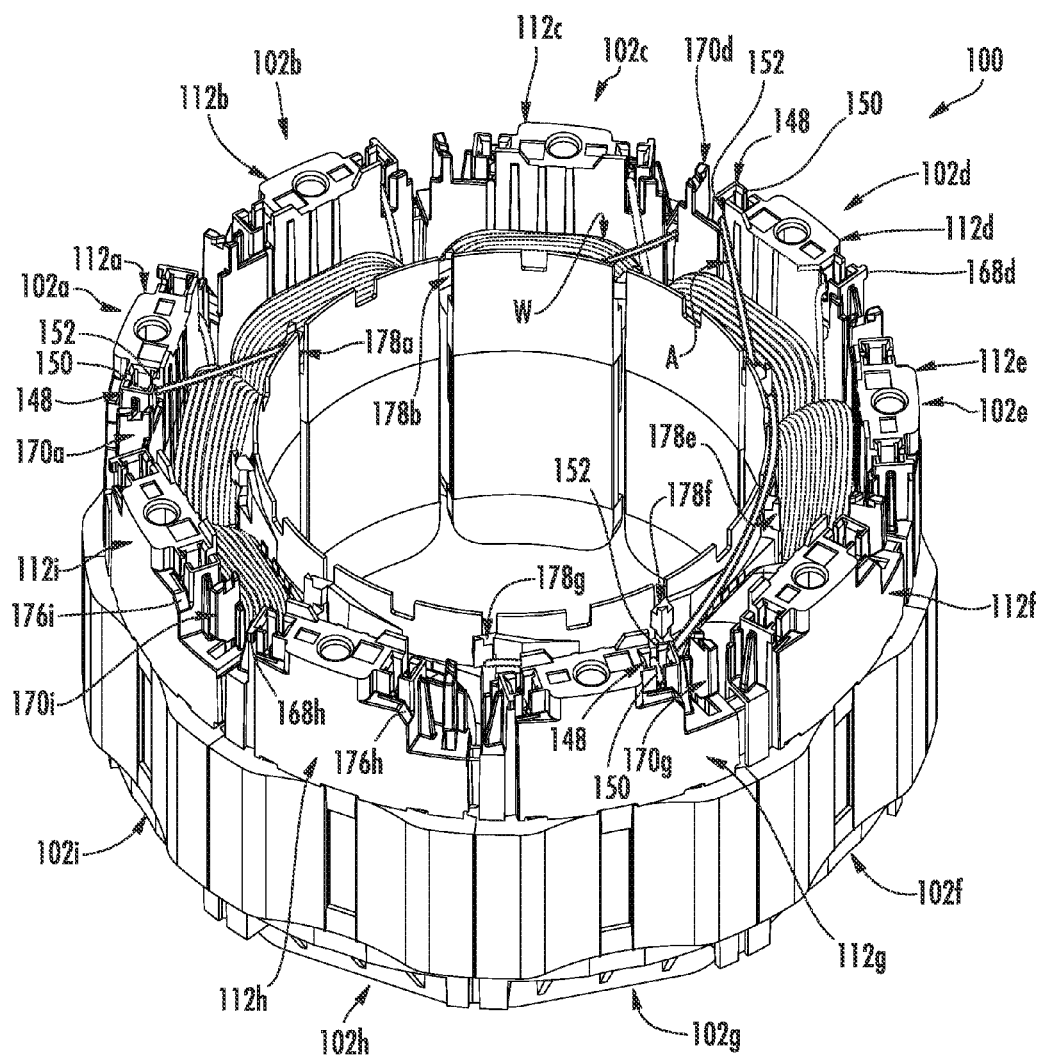
FIG. 4 is the perspective view of FIG. 1 with a Phase-A interconnect wire shown included in the segmented stator assembly.
Figure 5:
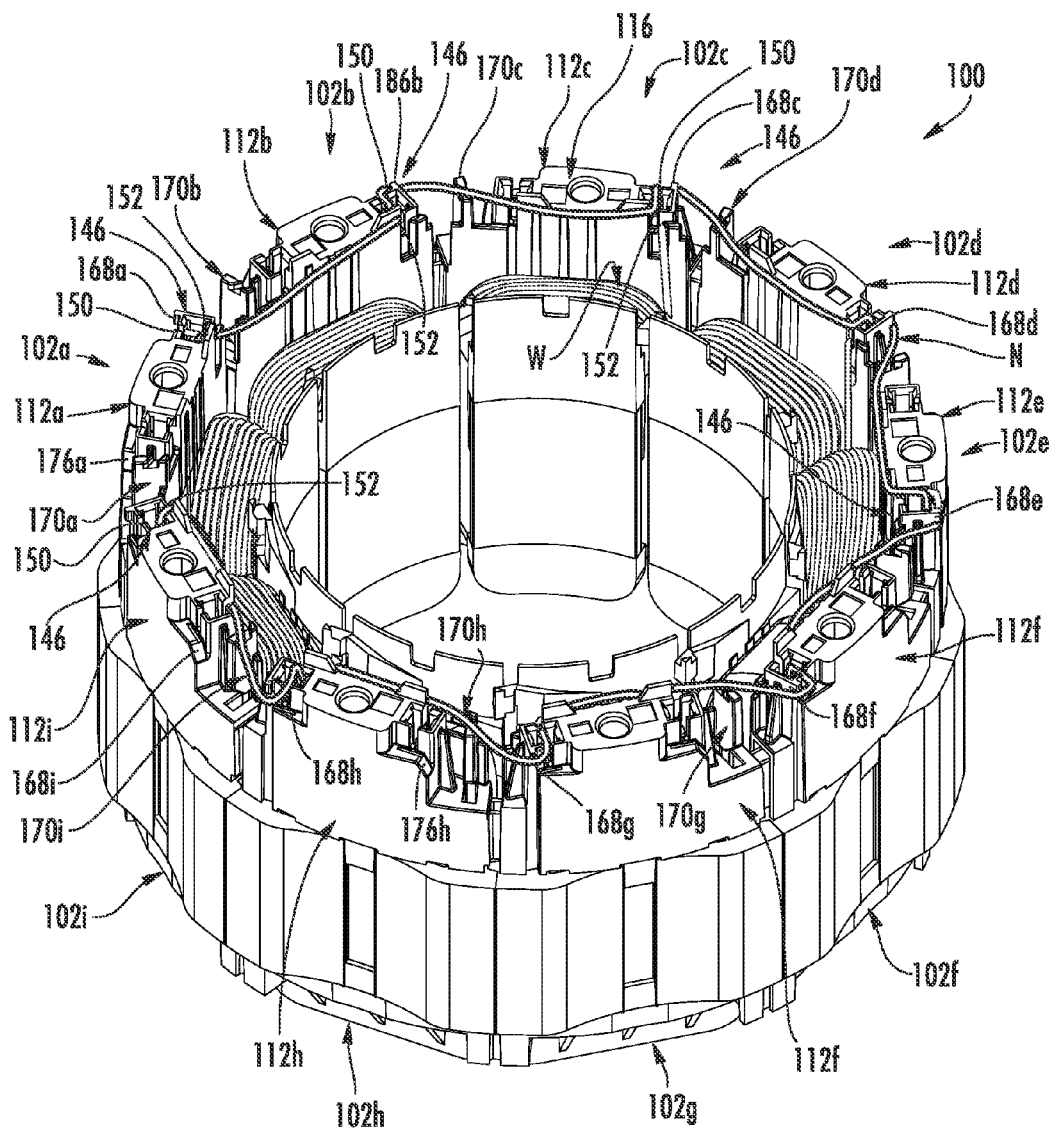
FIG. 5 is the perspective view of FIG. 1 with a neutral interconnect wire shown included in the segmented stator assembly.
Figure 6:
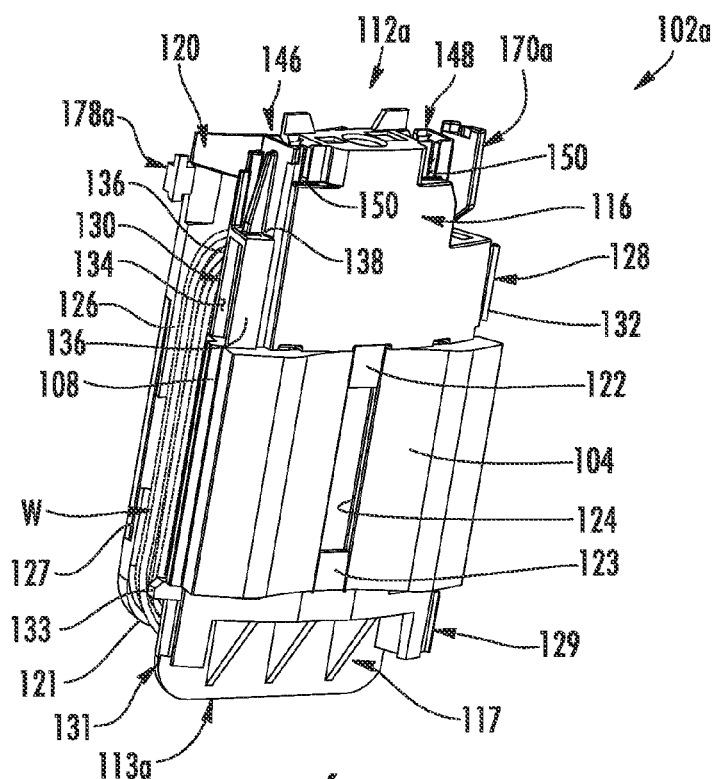
FIG. 6 is a forward perspective view of a first stator segment of the segmented stator assembly of FIG. 1.
Figure 7:
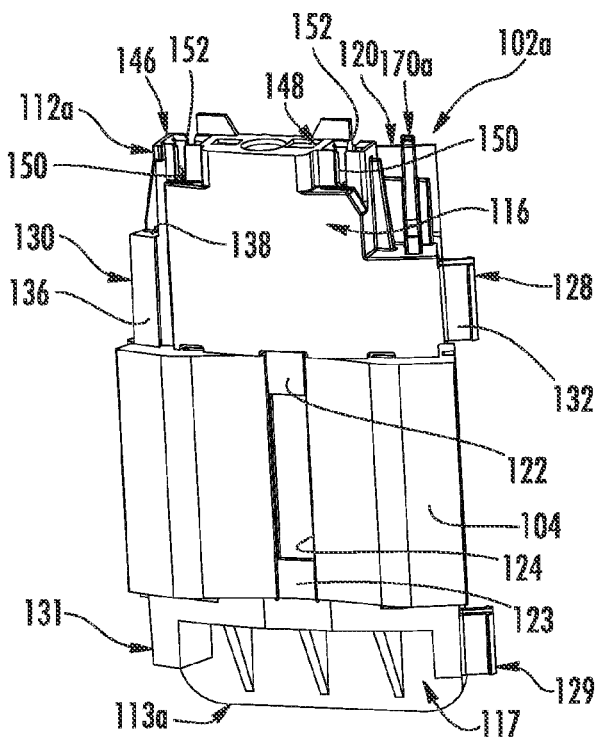
FIG. 7 is another forward perspective view of the first stator segment of FIG. 6.

In the illustrated embodiment, the first terminal pocket 146 of the lead end cap 112a of the first stator segment 102a is configured to receive a first end portion (a trailing end portion) of the wire winding W wrapped around the stator segment 102a (FIGS. 8 and 9) along with a first end portion of a neutral interconnect wire N interconnecting all of the stator segments 102a-i (FIG. 5). And, the second terminal pocket 148 is configured to receive a second end portion (a leading end portion) of the wire winding W wrapped around the stator segment 102a (FIGS. 8 and 9) along with a Phase-A interconnect wire A interconnecting the first stator segment 102a with the fourth stator segment 102d and the seventh stator segment 102g of the segmented stator assembly 100 (FIG. 4). The wiring scheme of all of the stator segments 102a-i will be described in more detail hereinafter.

The first and second terminal pockets 146, 148 each include a forward slot opening 150 and a rearward slot opening 152. The forward and rearward slot openings 150, 152 are configured to receive the appropriate wires into (and through, as desired) the terminal pockets 146, 148. In the illustrated embodiment, for example, the rearward slot opening 152 of the first terminal pocket 146 is positioned laterally away from an opposite edge portion of the bridge 118 and receives the first end portion of the wire winding W and the neutral interconnect wire N (FIGS. 8 and 9). And, the rearward slot opening 152 of the second terminal pocket 148 is substantially aligned with an edge portion of the bridge 118 and receives the second end portion of the wire winding W (FIGS. 8 and 9) and the Phase-C interconnect wire C (FIG. 4). In addition, the second end portion of the wire winding W is directed from the wire winding W to the second terminal pocket 148 via a channel 154 extending between the edge portion of the bridge 118 and the rearward slot opening 150. The channel 154 operates to guide the second end portion of the wire winding W to the second terminal pocket 148 and reduce the profile of the wire winding W as it extends to the second terminal pocket 148.

The forward slot openings 150 of the first and second terminal pockets 146, 148 position wires received by the pockets 146, 148 (in the illustrated embodiment, this includes the first and second end portions of the wire windings W, an end portion of the neutral interconnect wire N, an end portion of the Phase-C interconnect wire C) for desired trimming and/or in a desired relationship to the outward portion of the segmented stator assembly 100 (and a motor shell into which the segmented stator assembly 100 can be positioned).

A shelf 156 is formed generally between each of the first and second terminal pockets 146, 148 and the generally arcuate outward portion of the body 116. And, a trough 158 is formed in each of the shelves 156 adjacent each of the terminal pockets 146, 148 and generally below each of the forward slot openings 150 of the terminal pockets 146, 148. The shelves 156 provide surfaces (e.g., cutting surfaces, etc.) against which desired wires received by the first and second terminal pockets 146, 148 can be trimmed (e.g., cut with blades, etc.). The troughs 158 allow cutting devices (e.g., blades, etc.) to move completely through the wires being trimmed to help provide clean cuts and desired cut tolerances. The wires can be bent prior to trimming such that the troughs 158 may also operate to at least partly deform the end portions of the wires being trimmed to help inhibit the trimmed wires from pulling back through the forward slot openings 150 (and back through the first and second terminal pockets 146, 148) after they are trimmed.

The first and second terminal pockets 146, 148 also each include a buttress 160 formed along an outer lateral sidewall portion of each of the first and second terminal pockets 146, 148 (and on the cover 138 of the female coupling 130). The buttresses 160 are configured to reinforce, strengthen, etc. the outer lateral sidewall portions of the terminal pockets 146, 148, for example, against bending, flexing, breaking, etc. when wires and/or an IDC is positioned in the terminal pockets 146, 148. In the illustrated embodiment, each of the buttresses 160 are shaped to provide additional support to the outer lateral sidewall portions of the terminal pockets 146, 148 at lower portions of the terminal pockets 146, 148, for example, where an IDC engages wires in the terminal pockets 146, 148.

The first and second terminal pockets 146, 148 also each include steps 162 formed within the terminal pockets 146, 148 toward the lower portions of the terminal pockets 146, 148. The steps 162 facilitate positioning, retention, securing, etc. of an IDC in each of the terminal pockets 146, 148. The steps 162 formed in the first terminal pocket 146 will be described next with reference to FIG. 13, with it understood that a description of the steps 162 formed in the second terminal pocket 148 is substantially the same (although the steps formed in the second terminal pocket could be different within the scope of the present disclosure).

Figure 13:
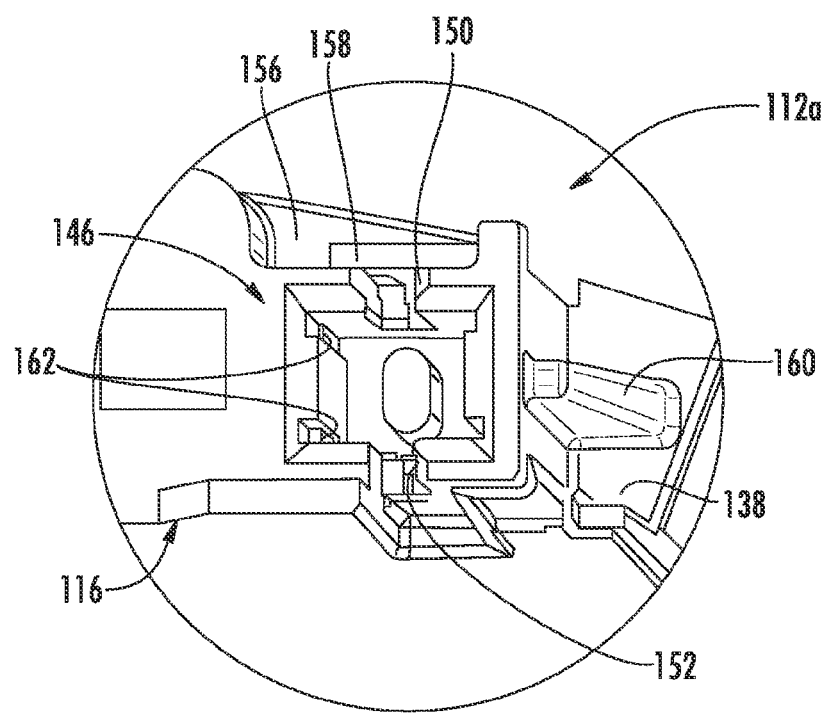
FIG. 13 is an enlarged fragmentary view of a first terminal pocket of the lead end cap of FIG. 10.

As shown in FIG. 13, the first terminal pocket 146 includes four steps 162 formed in corner portions of the terminal pocket 146 at a location generally within the terminal pocket 146 (below the upper opening leading into the terminal pocket 146). As such, the steps 162 define generally narrowed portions within the terminal pocket 146 (at the lower portion of the terminal pocket 146 and toward the corner portions of the terminal pocket 146) that provide for an interference fit between the IDC and the terminal pocket 146 when the IDC is received in the terminal pocket 146. The location of the steps 162 depthwise in the terminal pocket 146 allows for the IDC to be at least partially received into the terminal pocket 146 before the interference begins. The steps 162 formed along the outer lateral sidewall portion (to the right in FIG. 13) also provide a generally thicker base to the outer lateral sidewall portion toward the lower portion of the terminal pocket 146 which provides clearance to fit a wider IDC and carrier tabs and allows for reception of larger gauge wires (e.g., wires having sizes up to about 17 gauge, etc.) while reducing stress on the terminal pocket 146. These steps 162 also, in combination with the buttress 160 also located therealong, can further help inhibit bending, flexing, breaking, etc. of the outer lateral sidewall portion of the terminal pocket 146, for example, when the IDC is inserted, etc. In the illustrated embodiment, the steps 162 are formed along two opposing lateral sidewall portions of the first terminal pocket 146. In other example embodiments, steps may be formed along single sidewall portions of terminal pockets, along multiple sidewall portions of terminal pockets, etc. to facilitate positioning and retention of IDCs in the terminal pockets.

As shown in FIGS. 14-18 (together with FIGS. 2-5), the illustrated lead end cap 112a includes multiple wire positioning features configured to isolate, separate, hold, retain, guide, route, position, etc. wires (e.g., wire windings W; interconnect wires A, B, C, N; etc.) on the lead end cap 112a (e.g., relative to other wires, relative to the lead end cap 112a, relative to the stator segment 102a, relative to a motor shell, etc.). Example wire positioning features of the illustrated lead end cap 112a include a desired height ratio between the body 116 and the inboard wall 120, as well as various wire retainers (e.g., arm 168a, hook 170a, etc.), guides (angled guide 176a, etc.), cleats (e.g., cleats 178a, etc.), walls (e.g., walls 186, etc.), etc. positioned on the lead end cap 112a. At least some of these wire positioning features can help create a minimum of about 0.030-inch or more of air clearance between adjacent wires which, in turn, can help inhibit phase-on-phase issues, etc. between differently phased wires of the segmented stator assembly 100. In addition, at least some of these wire positioning features can help with operations of stitching wires on the segmented stator assembly 100.

Figure 14:
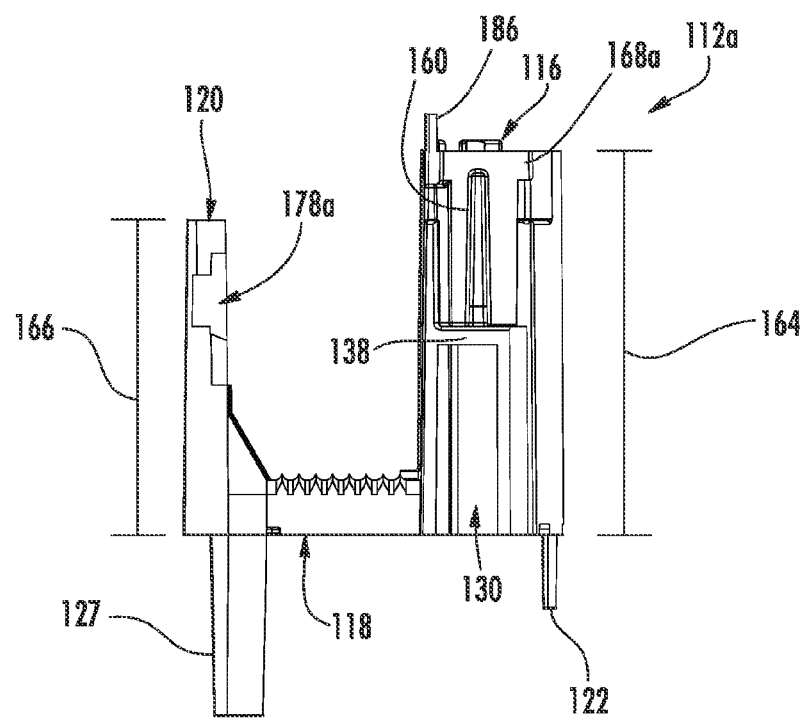
FIG. 14 is a left elevation view of the lead end cap of FIG. 10.
Figure 15:
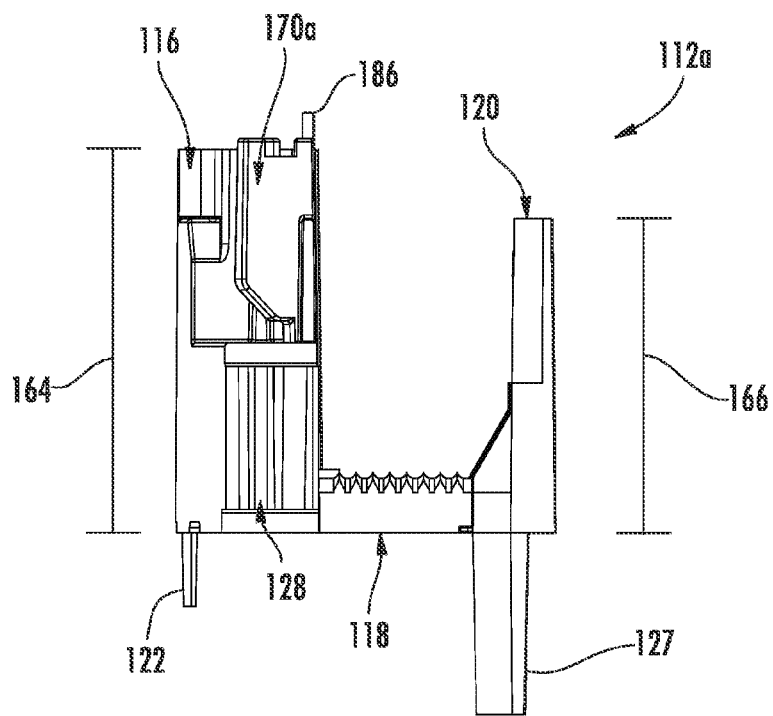
FIG. 15 is a right elevation view of the lead end cap of FIG. 10.

As shown in FIGS. 14 and 15, a height 164 of the body 116 of the illustrated lead end cap 112a is greater than a height 166 of the inboard wall 120. The greater height 164 of the body 116 acts to elevate the various interconnect wires (e.g., wires A, B, C, N, etc.) of the segmented stator assembly 100 over the wire windings W of the first stator segment 102a to provide desired clearance between the wires.

Figure 16:
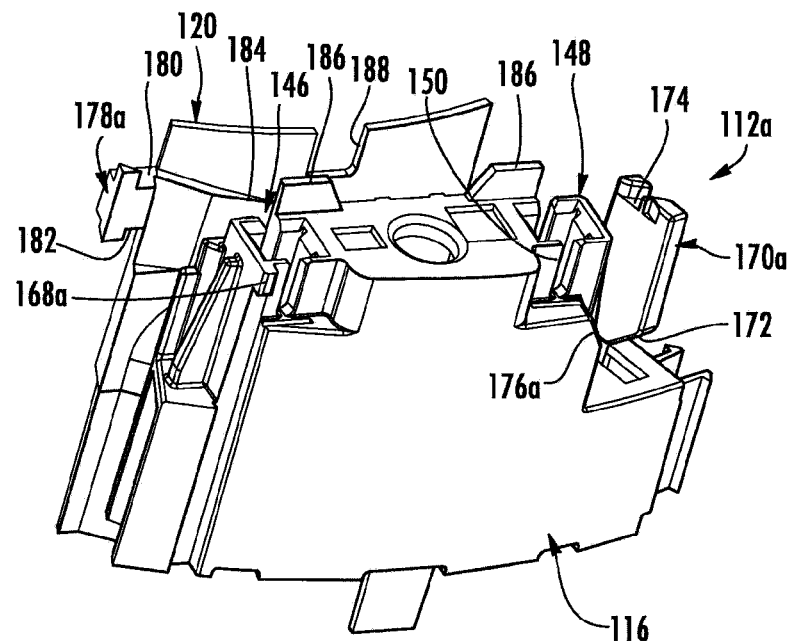
FIG. 16 is a forward perspective view of the lead end cap of FIG. 10.

As shown in FIG. 16, the body 116 of the illustrated lead end cap 112a includes arm 168a (broadly, a retainer) disposed toward the upper end portion of the body 116 along the outward portion of the body 116 (adjacent the first terminal pocket 146). While not used as such on the first stator segment 102a in the illustrated embodiment, the arm 168a is configured to receive, support, etc. the neutral interconnect wire N received by the first terminal pocket 146 in a desired position and inhibit movement of the interconnect wire N in at least one direction along a line extending generally between the upper end portion of the body 116 and the lower end portion of the body 116 (see, arms 168b-h of the end caps 112b-h of the second through eighth stator segments 102b-h illustrated in FIG. 5). The arm 168a is formed on a forward sidewall portion of the first terminal pocket 146 and is configured to receive the neutral interconnect wire N generally under the arm 168a and inhibit movement (e.g., sliding movement, rolling movement, etc.) of the wire N relative to the arm 168a (over the arm 168a) into a position generally over the upper end portion of the body 116. In the illustrated embodiment, the arm 168a is formed monolithically with the body 116 (e.g., via a molding process, etc.). In other example embodiments, end caps can include bodies having arms formed separately from the bodies and subsequently coupled thereto (e.g., welded, etc.).

The body 116 also includes hook 170a (also broadly, a retainer) disposed apart from the second terminal pocket 148 generally laterally of the second terminal pocket 148. While not used as such on the first stator segment 102a in the illustrated embodiment, the hook 170a is configured to vertically separate the neutral interconnect wire N received through the first terminal pocket 146 and one of the Phase-A, -B, or -C interconnect wires A, B, C received through the second terminal pocket 148 (see, hooks 170b, 170c, 170g, 170h, 170i of the second, third, seventh, eighth, and ninth lead end caps 112b, 112c, 112g, 112h, 112i of the second, third, seventh, eighth, and ninth stator segments 102b, 102c, 102g, 102h, 102i illustrated in FIGS. 2-5). As shown in FIG. 16, the hook 170a includes a lower wedge 172 configured to receive one of the Phase-A, -B, or -C interconnect wires A, B, C received into and/or through the second terminal pocket 148, and an upper notch 174 configured to receive the neutral interconnect wire N received into and/or through the first terminal pocket 146. As such, the lower wedge 172 and the upper notch 174 support, route, etc. the respective wires in desired positions and inhibit undesired movement of the wires relative to the lead end cap 102a (e.g., in at least one direction along a line extending generally between the upper end portion of the body 116 and the lower end portion of the body 116, etc.).

The body 116 also includes an angled guide 176a disposed adjacent the forward slot opening 150 of the second terminal pocket 148. As viewed in FIG. 16, the angled guide 176a slopes (from left to right in FIG. 16) generally from the upper end portion of the body 116 toward the lower end portion of the body 116. Again, while not used as such on the first stator segment 102a in the illustrated embodiment, the angled guide 176a is configured to allow locating one of the Phase-A, -B, or -C interconnect wires A, B, C received through the second terminal pocket 148 in a desired position on the lead end cap 102a along the angled guide 176a between the second terminal pocket 148 and the lower wedge 172 of the hook 170a (see, angled guides 176h, 176i of the eighth and ninth lead end caps 112h, 112i of the second and third stator segments 102b, 102c illustrated in FIGS. 2 and 3). In particular, the angled guide 176a allows for locating the Phase-A, -B, or -C interconnect wires A, B, C received through the forward slot opening 150 of the second terminal pocket 148 at a steeper angle between the second terminal pocket 148 and the lower wedge 172 of the hook 170a without bending, kinking, etc. the wire (thus also accommodating the vertical separation provided by the hook 170a between the lower wedge 172 and the upper notch 174).

Figure 2:
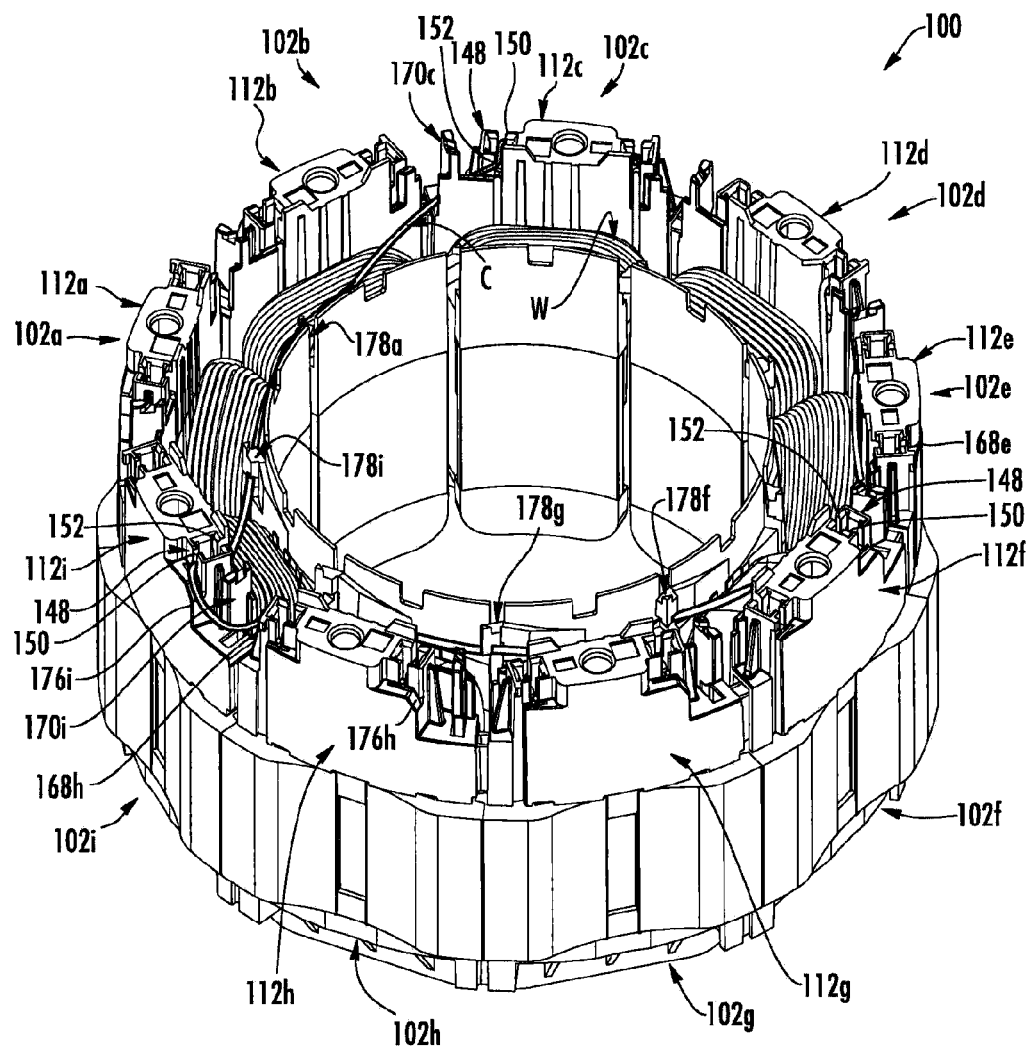
FIG. 2 is the perspective view of FIG. 1 with a Phase-C interconnect wire shown included in the segmented stator assembly.

The inboard wall 120 of the illustrated lead end cap 112a includes cleat 178a positioned along a lateral sidewall portion of the inboard wall 120. The cleat is configured to receive, support, etc. Phase-A, -B, and/or -C interconnect wires A, B, C extending between different stator segments 102a-i of the segmented stator assembly 100. The cleat 178a includes an upper guide 180 and a lower guide 182 so that the cleat 178a can receive, support, etc. two different interconnect wires while also helping maintain vertical separation of the interconnect wires. In the illustrated embodiment, the upper guide 180 of the cleat 178a of the first stator segment 102a receives the Phase-A interconnect wire A (FIG. 4) and the lower guide 182 receives the Phase-C interconnect wire C (FIG. 2). In addition, plateaus 184 located along the inner surface of the inboard wall 120 can help receive, support, etc. the Phase-A, -B, and/or -C interconnect wires A, B, C in conjunction with the cleat 178a. The plateaus 184 are also angled to help provide clearance between the Phase-A, -B, and/or -C interconnect wires A, B, C supported by the cleat 178a.

Figure 17:
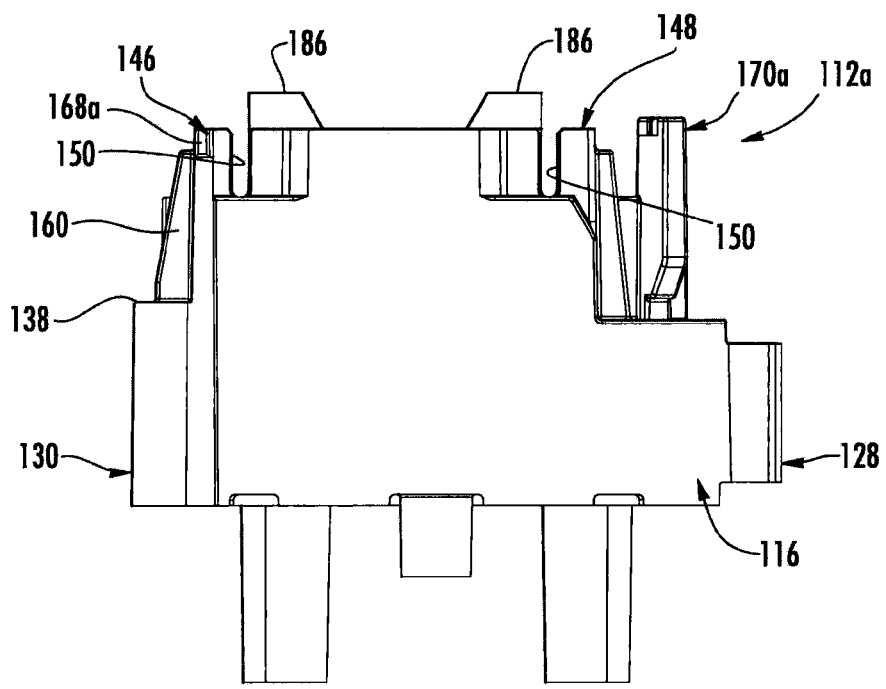
FIG. 17 is a front elevation view of the lead end cap of FIG. 10.
Figure 18:
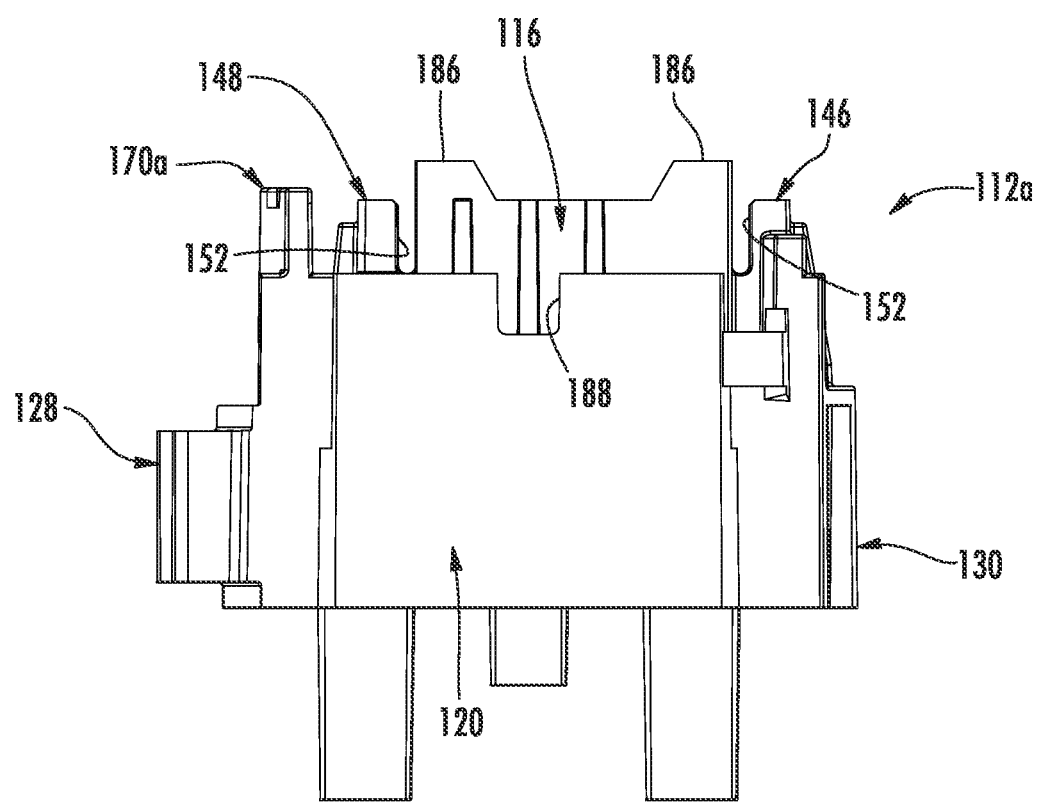
FIG. 18 is a rear elevation view of the lead end cap of FIG. 10.

With additional reference to FIGS. 17 and 18, the body 116 of the illustrated lead end cap 112a includes upwardly protruding walls (each indicated by reference number 186) disposed along the upper end portion of the body 116. The walls 186 are positioned adjacent the rearward slot openings 152 of the first and second terminal pockets 146, 148 for use in aligning the various interconnect wires (e.g., wires A, B, C, N, etc.) with the rearward slot openings 152 when installing the interconnect wires to the stator segment 102a during manufacture. For example, the walls 186 can allow a winding probe or nozzle to bend the interconnect wires above the terminal pockets 146, 148 before the wires are put into the rearward slot openings 152 (and then into the terminal pockets 146, 148).

The inboard wall 120 of the illustrated lead end cap 112a also defines a notch 188 (broadly, an identifier) along the upper end portion of the inboard wall 120. Presence, absence, location, and/or number of notches (e.g., as determined using sensors, lasers, rods, etc.) along the upper end portion of the inboard wall 120 can be used for determining a particular wire winding gauge, interconnect wire gauge, etc. to be used with the given lead end cap 112a and stator segment 102a (as particular end caps, and their terminal pockets, may be configured for use with particular wire gauges). For example, the illustrated lead end cap 112a includes a single notch 188 generally centrally located along the upper end portion of the inboard wall 120. Notches could alternatively be located in two other positions along the upper end portion of the inboard wall 120 such that eight different possible variations of notches are possible in the illustrated embodiment. In other example embodiments, end caps may include single notches located differently along upper end portions of inboard walls (e.g., in one of three positions along the inboard walls, etc.), multiple notches located along upper end portions of inboard walls (e.g., in combinations of positions along the inboard walls, etc.), no notches located along upper end portions of inboard walls, etc.

With reference again to FIGS. 2-9, the example wiring scheme of the illustrated segmented stator assembly 100 will now be described. Other wiring schemes may be used, however, within the scope of the present disclosure.

As shown in FIGS. 6-9, the individual stator segments (e.g., stator segment 102a, etc.) can each be wound with wire windings W using, for example, a spindle and bobbin winding operation. For example, stator segment 102a can be positioned in an arbor machine (not shown) supporting the lead end cap 112a and the base end cap 113a of the stator segment 102. And, a first end portion of the wire winding W is positioned in the second terminal pocket 148 of the lead end cap 112a through the forward and rearward slot openings 150, 152. The arbor machine is then activated to rotate the stator segment 102a while a movable wire nozzle (not shown) feeds wire thereto. As the stator segment 102a rotates, the wire W is wound about the tooth 106 of the stator segment 102a and the bridges (not visible) of the lead end cap 112a and the base end cap 113a. Once the desired wire windings W are formed, the wire W is then positioned in the first terminal pocket 146 through the rearward and forward slot openings 152, 150 thereof and trimmed (e.g., leaving excess wire extending through the forward slot openings 150 out of the first and second terminal pockets 146, 147, etc.). The other stator segments 102b-i of the segmented stator assembly 100 can similarly be wound with wire W. And, the wound stator segment 102a-i can then be coupled together into the annular form of the segmented stator assembly 100 illustrated in FIG. 1.

FIG. 2 illustrates the Phase-C interconnect wire C installed to the segmented stator assembly 100. The Phase-C interconnect wire C is generally installed before installation of the Phase-A and -B interconnect wires A, B and the neutral interconnect wire N. The Phase-A and -B interconnect wires A, B and the neutral interconnect wire N are omitted from FIG. 2 for clarity.

Installation of the Phase-C interconnect wire includes connecting the wire C to the second terminal pockets 148 of the third, ninth, and sixth stator segments 102c, 102i, 102f in a generally counterclockwise direction (as viewed in FIG. 2). For example, a first end portion of the Phase-C interconnect wire C is initially positioned in the second terminal pocket 148 of the third stator segment 102c (e.g., with an excess end portion thereof extending through the forward slot opening 150, etc.). At the third stator segment 102c, the wire C is threaded through the rearward slot opening 152 of the second terminal pocket 148, around the outer lateral sidewall portion of the second terminal pocket 148, and under the lower wedge (not visible) of the hook 170c. The wire C is then threaded through the lower guides of the inboard wall cleats 178a, 178i of the first and ninth stator segments 102a, 102i and into the second terminal pocket 148 of the ninth stator segment 102i (via the rearward slot opening 152). At the ninth stator segment 102i, the wire C is threaded out of the second terminal pocket 148 (via the forward slot opening 150), along the angled guide 176i, and under the lower wedge of the hook 170i. The wire C is then threaded through the lower guides of the inboard wall cleats 178g, 178f of the seventh and sixth stator segments 102g, 102f and into the second terminal pocket 148 of the sixth stator segment 102f (via the rearward slot opening 152) where the wire C is terminated (e.g., with an excess end portion thereof extending through the forward slot opening 150, etc.). As will be described in further detail hereinafter, the Phase-C interconnect wire C can subsequently (at the completion of the assembly operation) be electrically coupled to the second end portions of the wire windings W of the third, ninth, and sixth stator segments 102c, 102i, 102f (already located in the second terminal pockets 148) by inserting an IDC into each of the second terminal pockets 148.

Figure 3:
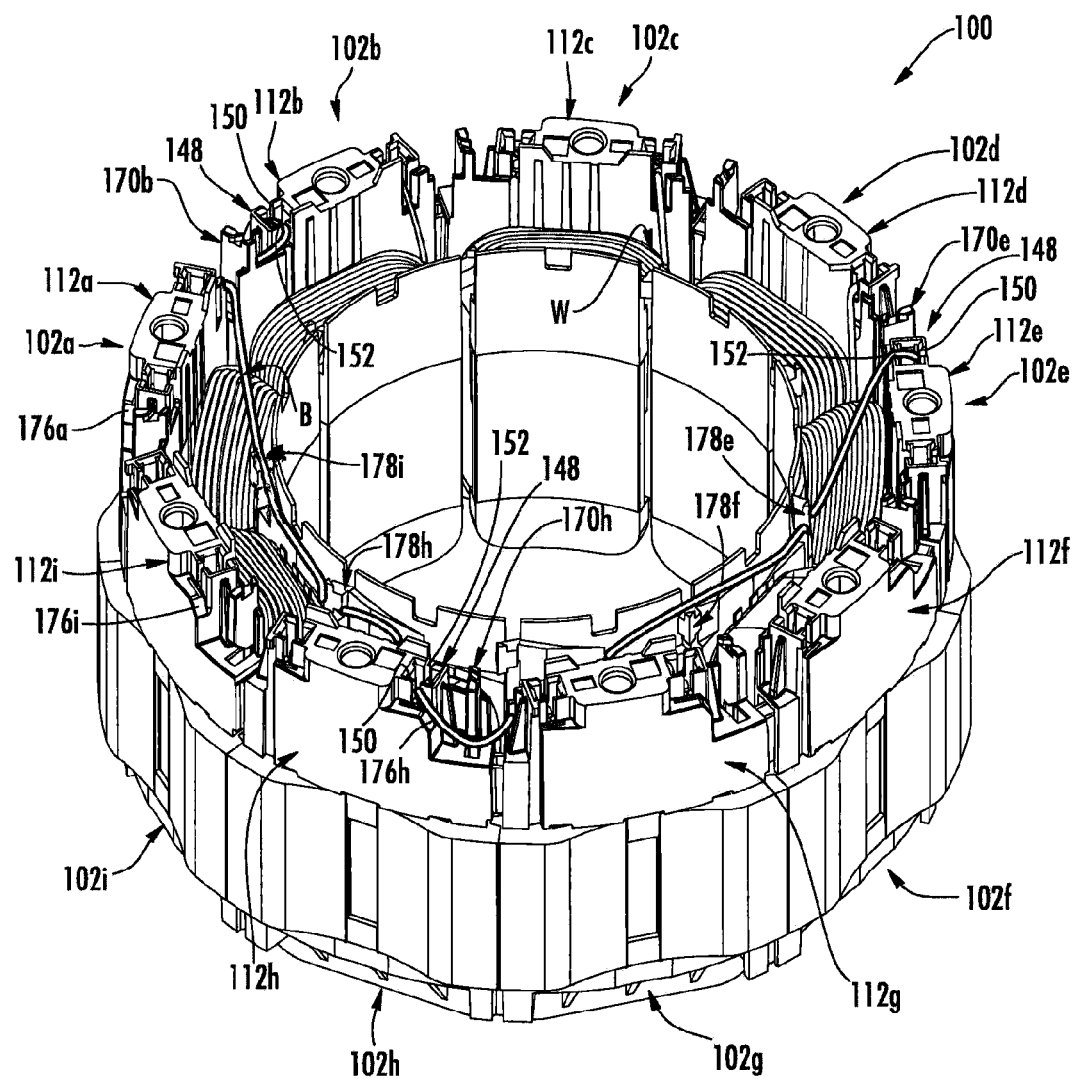
FIG. 3 is the perspective view of FIG. 1 with a Phase-B interconnect wire shown included in the segmented stator assembly.

FIG. 3 illustrates the Phase-B interconnect wire B installed to the segmented stator assembly 100. The Phase-B interconnect wire B is generally installed after the Phase-C interconnect wire C but before the Phase-A interconnect wire A and the neutral interconnect wire N. The Phase-A and -C interconnect wires A, C and the neutral interconnect wire N are omitted from FIG. 3 for clarity.

Installation of the Phase-B interconnect wire B includes connecting the wire B to the second terminal pockets 148 of the second, eighth, and fifth stator segments 102b, 102h, 102e in a generally counterclockwise direction (as viewed in FIG. 3). For example, a first end portion of the Phase-B interconnect wire B is initially positioned in the second terminal pocket 148 of the second stator segment 102b (e.g., with an excess end portion thereof extending through the forward slot opening 150, etc.). At the second stator segment 102b, the wire B is threaded through the rearward slot opening 152 of the second terminal pocket 148, around the outer lateral sidewall portion of the second terminal pocket 148, and under the lower wedge (not visible) of the hook 170b. The wire B is then threaded through the upper guide of the inboard wall cleat 178i of the ninth stator segment 102i, through the lower guide of the inboard wall cleat 178h of the eighth stator segment 102h, and into the second terminal pocket 148 of the eighth stator segment 102h (via the rearward slot opening 152). At the eighth stator segment 102h, the wire B is threaded out of the second terminal pocket 148 (via the forward slot opening 150), along the angled guide 176h, and under the lower wedge of the hook 170h. The wire B is then threaded through the upper guide of the inboard wall cleat 178f of the sixth stator segment 102f, through the lower guide of the inboard wall cleat 178e of the fifth stator segment 102e, and into the second terminal pocket 148 (via the rearward slot opening 152) of the fifth stator segment 102e (where the wire B is terminated, for example, with an excess end portion thereof extending through the forward slot opening 150, etc.). As will be described in further detail hereinafter, the Phase-B interconnect wire B can subsequently (at the completion of the assembly operation) be electrically coupled to the second end portions of the wire windings W of the second, eighth, and fifth stator segments 102a, 102h, 102e (already located in the second terminal pockets 148) by inserting an IDC into each of the second terminal pockets 148.

FIG. 4 illustrates the Phase-A interconnect wire A installed to the segmented stator assembly 100. The Phase-A interconnect wire A is generally installed after the Phase-C and Phase-B interconnect wires C, B but before the neutral interconnect wire N. The Phase-B and -C interconnect wires B, C and the neutral interconnect wire N are omitted from FIG. 4 for clarity.

Installation of the Phase-A interconnect wire A includes connecting the wire A to the second terminal pockets 148 of the seventh, fourth, and first stator segments 102g, 102d, 102a in a generally counterclockwise direction (as viewed in FIG. 4). For example, a first end portion of the Phase-A interconnect wire A is initially positioned in the second terminal pocket 148 of the seventh stator segment 102g (e.g., with an excess end portion thereof extending through the forward slot opening 150, etc.). At the seventh stator segment 102g, the wire A is threaded out of the second terminal pocket 148 (via the rearward slot opening 152), through the upper guide of the inboard wall cleat 178e of the fifth stator segment 102e, through the lower guide of the inboard wall cleat 178d of the fourth stator segment 102d, and into the second terminal pocket 148 of the fourth stator segment 102d (via the rearward slot opening 152). At the fourth stator segment 102d, the wire A is threaded out of the second terminal pocket 148 (via the forward slot opening 150), along the angled guide (not visible), and under the lower wedge (not visible) of the hook 170d. The wire A is then threaded through the lower guide of the inboard wall cleat 178b of the second stator segment 102b, the upper guide of the inboard wall cleat 178a of the first stator segment 102a, and into the second terminal pocket 148 of the first stator segment 102a (via the rearward slot opening 152) where the wire A is terminated (e.g., with an excess end portion thereof extending through the forward slot opening 150, etc.). As will be described in further detail hereinafter, the Phase-A interconnect wire A can subsequently (at the completion of the assembly operation) be electrically coupled to the second end portions of the wire windings W of the seventh, fourth, and first stator segments 102g, 102d, 102a (already located in the second terminal pockets 148) by inserting an IDC into each of the second terminal pockets 148.

FIG. 5 illustrates the neutral interconnect wire N installed to the segmented stator assembly 100. The neutral interconnect wire N is generally installed after the Phase-C, Phase-B, and Phase-A interconnect wires C, B, A. The Phase-A, -B, and -C interconnect wires A, B, C are omitted from FIG. 5 for clarity.

Installation of the neutral interconnect wire N includes connecting the wire to first terminal pockets 146 of all nine of the stator segments 102a-i in a generally clockwise direction (as viewed in FIG. 5). For example, a first end portion of the neutral interconnect wire N is initially positioned in the first terminal pocket 146 of the first stator segment 102a (e.g., with an excess end portion thereof extending through the forward slot opening 150, etc.). The wire N is threaded out of the first terminal pocket 146 of the first stator segment 102a (via the rearward slot opening 152), generally around the body 116 of the second stator segment 102b, and into the second pocket 148 of the second stator segment 102b (via the rearward slot opening 152). At the second stator segment 102b, the wire N is threaded out of the second pocket 148 (via the forward slot opening 150) and under the arm 168b. The wire N is then threaded through the upper notch of the hook 170c of the third stator segment 102c, generally around the body 116 of the third stator segment 102c, and into the first terminal pocket 146 of the third stator segment 102c (via the rearward slot opening 152). This pattern of threading the wire N continues through the fourth, fifth, sixth, seventh, eighth, and ninth stator segments 102d-i, ending when the wire is received in the first terminal pocket 146 of the ninth stator segment 102i (via the rearward slot opening 152) where the wire is terminated, for example, with an excess end portion thereof extending through the forward slot opening 150, etc. As will be described in further detail hereinafter, the neutral interconnect wire N can subsequently (at the completion of the assembly operation) be electrically coupled to the first end portions of the wire windings W of all of the stator segments 102a-i (already located in the first terminal pockets 146 thereof) by inserting an IDC into each of the first terminal pockets 146.

After threading each of the interconnect wires A, B, C, N through the stator segments 102a-i, an IDC can be inserted into each of the first and second terminal pockets 146, 148 of each of the stator segments 102a-i. And, excess end portions of the wires W, A, B, C, N extending through the forward slot openings 150 of the terminal pockets 146, 148 can then be trimmed, taking advantage of the shelves 156 and troughs 158 adjacent the terminal pockets 146, 148. A power lead (as part of a three-phase machine) (not shown) can then be connected to each IDC in the second terminal pockets 146, 148 of the first, second, and third stator segments 102a, 102b, 102c for operational use in an electric motor.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An end cap for a stator segment of a segmented stator assembly suitable for use in an electric machine, the end cap comprising:
    an inboard wall configured to couple the end cap to the stator segment adjacent a tooth of the stator segment, the inboard wall having an identifier configured to indicate a wire winding gauge to be used with the stator segment;
    a body configured to couple the end cap to the stator segment adjacent a yoke of the stator segment; and
    a bridge disposed generally between the body and the inboard wall of the end cap, the bridge configured to receive at least part of the wire winding between the body and the inboard wall;
    wherein the body includes at least one rib formed on an inner surface thereof generally facing the inboard wall, and wherein the inboard wall includes at least one rib formed on an inner surface thereof generally facing the body.

2. The end cap of claim 1, wherein the identifier includes the presence or absence of at least one notch in the inboard wall.

3. The end cap of claim 1, wherein the at least one rib of the body and the at least one rib of the inboard wall each having a thickness dimension of between about 0.005 inch and about 0.015 inch.

4. A segmented stator assembly comprising the end cap of claim 1.

5. An electric machine comprising the end cap of claim 1.

6. An end cap for a stator segment of a segmented stator assembly suitable for use in an electric machine, the end cap comprising a terminal pocket configured to receive a wire, the terminal pocket including at least one step formed in a lower portion of the terminal pocket and defining a narrowed portion of the terminal pocket, the at least one step located in a corner portion of the terminal pocket, the at least one step configured to provide an interference fit in the terminal pocket for use in securing the wire in the terminal pocket.

7. The end cap of claim 6, wherein the at least one step includes four steps.

8. The end cap of claim 6, wherein the terminal pocket includes a buttress disposed along at least part of a sidewall portion of the terminal pocket for reinforcing the terminal pocket.

9. The end cap of claim 6, wherein the terminal pocket is a first terminal pocket, the end cap further comprising a second terminal pocket configured to receive a wire.

10. The end cap of claim 7, further comprising:
    a body; and
    an inboard wall coupled to the body;
    wherein the body includes an outward portion defining a generally arcuate shape, the terminal pocket formed on the body at an inward location of the generally arcuate outward portion of the body.

11. The end cap of claim 10, wherein the body includes a shelf disposed generally between the terminal pocket and the generally arcuate outward portion of the body.

12. A segmented stator assembly comprising the end cap of claim 6.

13. An electric machine comprising the end cap of claim 6.

14. An end cap for a stator segment of a segmented stator assembly suitable for use in an electric machine, the end cap comprising a body configured to couple the end cap to the stator segment over a yoke of the stator segment, the body having a terminal pocket configured to receive a wire, and a shelf disposed generally between the terminal pocket and an outward portion of the body; wherein the shelf includes a trough disposed adjacent the terminal pocket.

15. The end cap of claim 14, wherein the terminal pocket is a first terminal pocket and the shelf is a first shelf, the body further comprising a second terminal pocket configured to receive a wire, and a second shelf disposed generally between the second terminal pocket and the outward portion of the body.

16. A segmented stator assembly comprising the end cap of claim 14.

17. An electric machine comprising the end cap of claim 14.

18. An end cap for a stator segment of a segmented stator assembly suitable for use in an electric machine, the end cap comprising:
    an inboard wall having first and second end portions, the inboard wall configured to couple the end cap to the stator segment at the first end portion of the inboard wall adjacent a tooth of the stator segment;
    a body having first and second end portions, the body configured to couple the end cap to the stator segment at the first end portion of the body adjacent a yoke of the stator segment; and
    a bridge disposed generally between the body and the inboard wall of the end cap, the bridge configured to receive at least part of a wire winding of the stator segment between the body and the inboard wall;
    wherein the body includes at least one rib extending in a direction generally between the first and second end portions of the body, and wherein the inboard wall includes at least one rib extending in a direction generally between the first and second end portions of the inboard wall.

19. The end cap of claim 18, wherein the at least one rib of the body and the at least one rib of the inboard wall each have a thickness dimension of between about 0.005 inch and about 0.015 inch.

* * * * *